United States Patent
Orbach et al.

(10) Patent No.: US 7,024,116 B2
(45) Date of Patent: Apr. 4, 2006

(54) OPTICAL ADD DROP MULTIPLEXER

(75) Inventors: Shlomo Orbach, Haifa (IL); Mark Raymond Zaacks, Rishon Lezion (IL)

(73) Assignee: ECI Telecom Ltd., Petach Tikva (IL)

( * ) Notice: Subject to any disclaimer, the term of this patent is extended or adjusted under 35 U.S.C. 154(b) by 583 days.

(21) Appl. No.: 09/883,341

(22) Filed: Jun. 19, 2001

(65) Prior Publication Data

US 2002/0191249 A1    Dec. 19, 2002

(30) Foreign Application Priority Data

May 24, 2001 (IL) .................................. 143368

(51) Int. Cl.
 *H04J 14/02* (2006.01)
(52) U.S. Cl. .............................. 398/83; 398/85; 398/87
(58) Field of Classification Search .................. 398/85, 398/27, 82, 83; 359/589; 385/24, 27, 37, 385/15, 46, 50

See application file for complete search history.

(56) References Cited

U.S. PATENT DOCUMENTS

| | | | |
|---|---|---|---|
| 5,170,290 A * | 12/1992 | Land et al. | 359/579 |
| 5,692,076 A * | 11/1997 | Delisle et al. | 385/15 |
| 6,097,516 A | 8/2000 | Almström | |
| 6,263,126 B1 * | 7/2001 | Cao | 385/24 |
| 6,288,810 B1 | 9/2001 | Grasso et al. | |
| 6,351,323 B1 * | 2/2002 | Onaka et al. | 398/84 |
| 6,370,296 B1 * | 4/2002 | Cao | 385/24 |
| 6,519,064 B1 * | 2/2003 | Fatehi et al. | 398/84 |
| 6,631,018 B1 * | 10/2003 | Milton et al. | 398/59 |
| 6,633,695 B1 * | 10/2003 | Bailey et al. | 385/24 |
| 6,687,463 B1 * | 2/2004 | Hutchison et al. | 398/83 |
| 6,879,619 B1 * | 4/2005 | Green et al. | 372/98 |

* cited by examiner

*Primary Examiner*—David C. Payne
(74) *Attorney, Agent, or Firm*—Browdy and Neimark, LLC

(57) ABSTRACT

The invention proposes a Grouped Optical Add Drop Multiplexer (GOADM) comprising a periodic filter for forming a group of spaced optical wavelengths to be dropped or added.

3 Claims, 7 Drawing Sheets

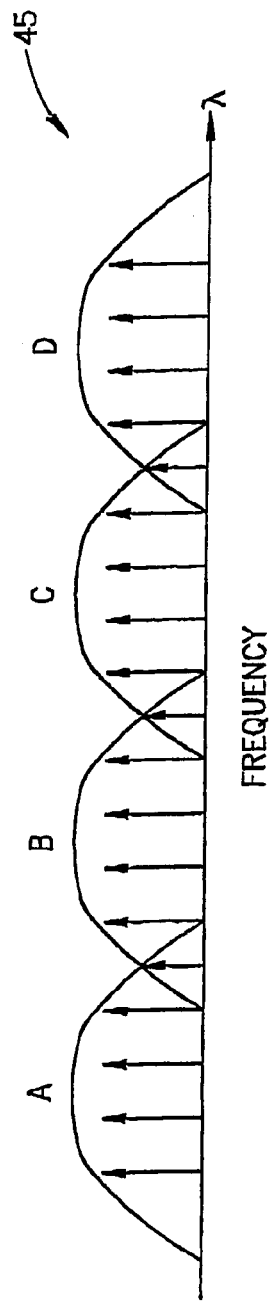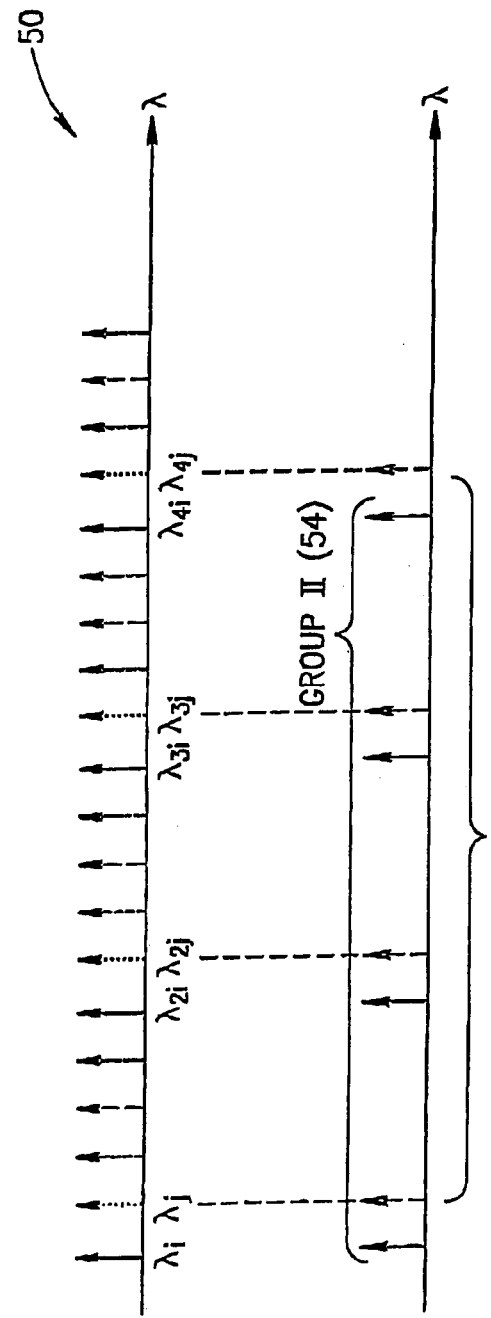

OPTICAL ADD DROP MULTIPLEXER

FIELD OF THE INVENTION

The invention relates to an optical add-drop multiplexer (OADM), more particularly to a so-called grouped OADM (GOADM).

BACKGROUND OF THE INVENTION

WDM (Wavelength Division Multiplexing) is a well established technology which is being used extensively in Optical Transport Networks. With this technology one may inject in one fiber many optical channels on different wavelengths (usually called optical channels or "colours"), by a combining/multiplexing operation performed by a MUX device. The whole group of channels/wavelengths on the same fiber can be separated by a separating/demultiplexing operation performed by a DMUX device.

An OADM (Optical Add-Drop Multiplexer) may be schematically viewed (see FIG. 1) as an Optical Network Element composed of transport interfaces, referred to as Network Node Interfaces (NNI) along with User Node Interfaces (UNI). An OADM provides functions that allow multiple optical channels received at its UNI to be multiplexed into its Outgoing NNI (the ADD function); and to demultiplex various optical channels for transmission at its UNI (the DROP function). The path from the incoming/input fiber to the output fiber, excluding the dropped and added wavelengths is called the "express path".

In other words, the main function of an OADM is to add and/or drop any selected number of the incoming wavelengths. All the remaining wavelengths (if any) which are not dropped, have to pass through the OADM express path essentially intact.

A classical configuration of OADM (shown in FIG. 2) performs:

1) full demultiplexing of a combined optical signal composed from a plurality of optical wavelengths (channels) incoming through an input fiber, 2a) dropping some optical channels, 2b) adding some optical channels, and 3) full multiplexing the remaining and added optical channels into the optical signal to be forwarded to an output fiber. The classical OADMs are known for their high insertion loss, i.e., there is usually more than 90% power loss through such OADM (more than 10 dB power loss). Moreover, the classical configuration is quite expensive.

There are many applications, for example in so-called Metro Ring Networks where only a small number of the incoming wavelengths (up to 4—for users' services) have to be separated for the ADD/DROP functions in one NE, and where the majority of the incoming wavelengths has to pass intact through the NE. The classical OADM configuration is therefore an inefficient solution for such cases.

For those cases where only a few wavelengths have to be dropped/added per one NE, a Single wavelength OADM (SOADM) was commercially proposed. A Single OADM makes use of an individual filter that performs either the DROP and the ADD function to a specific wavelength. The insertion loss (I.L.) of a single add/drop filter like that in the SOADM is typically 1.5–2.0 dB. In case a number of wavelengths are to be added/dropped, there is an option to connect the individual filters in series. However, the series combination of a considerable number of the single filters also introduces high insertion loss to the express path (i.e., to the wavelengths passing through).

Due to a considerable insertion loss of a classical OADM separating a single wavelength from a plurality of wavelengths transmitted via an optical fiber, as well as drawbacks of a SOADM, one presently accepted method of allocating wavelengths in an optical transmission line is the method of grouped wavelength allocation. To keep the advantage of low I.L. for more than a single wavelength, a so-called Grouped OADM (GOADM) includes a wide band pass filter for the ADD or the DROP operation. Each of these filters takes care of more than one wavelength (typically 4 adjacent wavelengths in the ITU-T Grid). The ITU-T wavelength Grid defines optical channels selected by the international standard organization ITU-T for use in Optical Networks/OADM Rings.

To this end, the modern telecommunication industry presently uses Grouped OADMs equipped with so-called grouped filters (FIG. 4). As of today, the grouped filter is a wide-band filter intended for adding or dropping a band of adjacent wavelengths to be further processed in the OADM or by other filters. In other words, one can use a single filter in an optical transmission line to filter a required group of wavelengths (i.e., to use a so-called primary filter), and then use further filtering to separate each wavelength in the group (by using so-called secondary filters). However, there is a problem of so-called "missed" wavelengths on the groups' borders due to the "slopped" response of the wide-band filters used for extracting the required groups of wavelengths (FIG. 5). At least one wavelengths adjacent but not belonging to a group at each side thereof is usually lost for transmitting any information in the network where such a wide-band group filter is present (in any of its OADMs). In a typical example of an optical network having a grouped OADM, only 32 optical channels, out of 40 nominally available channels, can be used due to this effect. Therefore, the bandwidth efficiency of the network with such OADM is only 80%.

However, the advantage of using the group filters rather than a series of individual filters is their low insertion loss being typically of about 1.5 dB for the group, as opposed to about 1.5 dB per channel (!) insertion loss in an OADM comprising single filters in series.

It should be emphasized that both the insertion loss of the today's OADM and the bandwidth efficiency thereof are very important parameters for a network utilizing the OADM. Reduction of the insertion loss saves the number of optical amplifiers and hence the network cost. The bandwidth efficiency increases the optical network capacity.

OBJECT OF THE INVENTION

It is therefore an object of the invention to provide an OADM being free of the above disadvantages.

SUMMARY OF THE INVENTION

The Inventors have realized that the object can be achieved by providing a Grouped OADM (GOADM) comprising a periodic filter for forming a group of spaced from one another optical channels (wavelengths) for dropping or adding thereof.

More particularly, the proposed Grouped Optical Add Drop Multiplexer (GOADM), for dropping or adding a group of optical wavelengths from/to a spectrum of optical wavelengths transmitted over an incoming optical line so that adjacent optical wavelengths in the spectrum are initially spaced from one another by a basic step "s", is an OADM comprising a periodic filter insertable in the incoming optical line as a primary filter to produce said group of optical wavelengths where adjacent wavelengths of the group are spaced from one another by a group step being equal to ks, wherein k is an integer >1.

The basic step "s" is typically defined by a standard organization, for example ITU-T, as a grid spacing in a wavelength grid. The value of "ks" is typically determined by a parameter of the periodic filter, called Free Spectrum Range (FSR). The periodic filter can be produced from a single individual filter by applying to it a wavelength shifting technique for narrowing its FSR parameter. By narrowing the FSR (Free Spectral Range) parameter of the SOADM filters, we will not get a single band pass filter with its center frequency at $\lambda_j$, but a "comb" of periodic band pass filters—based on the $\lambda_j$ single band pass filter with the "teeth" of the comb shifted one from another by the FSR measure. The shifting of the center frequencies of the comb's filters has to fit the wavelengths defined by the accepted grid (typically, the ITU-T grid).

The GOADM according to the invention is further provided with one or more secondary (second stage) filters connected to said periodic primary (first stage) filter, wherein each of said secondary filters is responsible of dropping or adding one particular wavelength from the group.

Actually, there is proposed a new product which is a new-type Grouped OADM (GOADM) wherein the periodic filter serves instead of a wide-band first stage filter. The new type of GOADM proposed by the Inventors can be called a Grouped Periodic OADM or GPOADM. The proposed new type of GOADM is characterized by a low insertion loss (as in a Single OADM or in a conventional GOADM), and by enabling the band efficiency of 100% in the optical network. The 100% efficient bandwidth use means, in this case, that all wavelengths (channels) existing in the network can be successfully utilized for valid transmission of optical information.

Indeed, the very intrinsic feature of the periodic filter enables provision of groups where the member wavelengths are spaced from one another as far as the filter allows. Owing to the periodic character of the filter, each of the wavelengths in such a group is picked separately, and there is no problem of wavelengths lost on the borders of the group (to be compared with the conventional GOADM, where grouped wide band filters produce "dense" groups and the border wavelengths are lost due to the sloped filter response of these wide band filters). Moreover, since only one periodic filter usually appears on the way of so-called "through" or "express" channels (those which are not added/dropped), the insertion loss (I.L.) with respect to these "express" channels is low. Owing to this fact, the use of the periodic filter in a GOADM is highly advantageous.

In view of the above, the proposed new-type GOADM enables dropping/adding of any required number of optical channels at a particular point of a network, while using the bandwidth efficiently and avoiding the excessive insertion loss on the express channels, which features differ the proposed invention from any previously known OADM.

The periodic filter can be used in two opposite directions—a first direction being for dropping said group of wavelengths from the spectrum, and a second direction—for adding said group of wavelengths to the spectrum.

Actually, the proposed GOADM may comprise one or both of an ADD module and a DROP module, wherein the DROP module comprises a first said periodic filter serving as a primary DROP periodic filter and connected to a first assembly comprising one or more secondary DROP filters each responsible of separating a particular wavelength from the group, and wherein the ADD module comprises a second said periodic filter serving as a primary ADD periodic filter and connected to a second assembly comprising one or more secondary ADD filters each responsible of picking a particular wavelength for the group.

In a basic embodiment, the GOADM comprises two separate said modules (the ADD module and the DROP module), each comprising its corresponding periodic primary filter connected to a suitable assembly of the secondary filter(s).

According to one specific embodiment, these two modules can be at least partially integrated and work simultaneously, thus performing the adding and/or dropping functions for a particular group of wavelengths in one single device. For example, the first periodic filter and the second periodic filter may form one and the same periodic filter. The described embodiment may be implemented by using a so-called micro-ring technology.

The periodic filter is characterized by its FSR (free-spectral range, actually constituting a so-called "group step" between wavelengths in the group). In practice, the periodic filter can be a Fabry-Perot filter, micro-ring or arrayed wave guide (AWG).

The secondary filters which can be used in the above-described device can be selected from the following non-exhaustive list comprising: thin film filters, Bragg gratings, micro-ring structures, AWG, etc.

In an improved embodiment of the invention, said periodic filter of the GOADM is tunable, i.e. is capable of obtaining a selectable sub-spectrum of the group in a desired fashion. The secondary filters in a GOADM with the tunable primary filter may be selected to be wide enough so as to continue separating the optical channels without deterioration of signals when the periodical filter is tuned.

According to yet a further embodiment of the invention, the secondary filters can be automatically tunable in response to the tuning of the periodic (primary) filter. The tuning of the secondary filters can be accompanied by re-routing in the ADD/DROP ports of the GOADM.

Further aspects and details of the present invention will become apparent as the description proceeds.

BRIEF DESCRIPTION OF THE DRAWINGS

The invention can be described and illustrated with the aid of the following non-limiting drawings, in which:

FIG. 5 illustrates the principle of wide-band group filters used in the prior art for GOADM.

FIG. 6 illustrates the principle of operation of the periodic filter which is used in the invention for creating groups of wavelengths for GOADM.

DETAILED DESCRIPTION OF THE DRAWINGS

Figure 1:
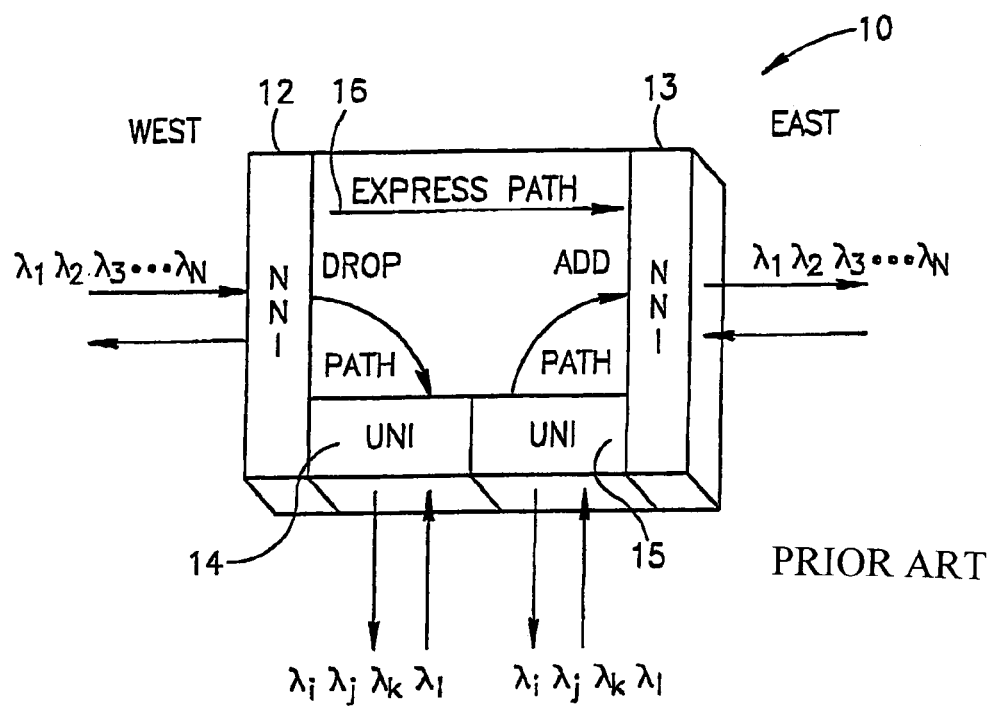
FIG. 1 (prior art)—illustrates a functional diagram of an OADM.

FIG. 1 shows a general functional block-diagram of OADM. It is shown as an Optical Network Element (1o) composed of a west transport interface (12), an east transport interface (13), both called Network Node Interfaces (NNI), and also of User Node Interfaces (UNI) marked 14 and 15. OADM provides functions that allow multiple optical channels received at its UNI to be multiplexed into its Outgoing NNI (the Add function); and to demultiplex various optical channels for transmission at its UNI (the Drop function).

The number of NNIs and UNIs supported by an OADM may differ, depending on the implementation of the OADM as well as on the network configuration. In general, an OADM may be considered to have two NNIs and one or more UNIs. FIG. 1 illustrates a functional block diagram of an OADM 10 made up of two NNIs (i.e. a bidirectional interface) on the East direction and a bidirectional interface on the West direction. The path from the incoming/input fiber to the output fiber, excluding the dropped and added wavelengths is called the "Express Path" and marked 16.

Each NNI carries N wavelengths. An OADM may be made up of K UNIs (where each UNI is composed of a bidirectional interface), with each UNI capable of carrying up to n<N wavelengths. In the case of n=1 the UNI supports a single wavelength interface.

The functional diagram of the OADM shown in FIG. 1 doesn't specify a fiber count (i.e. the arrows shown in the figure are representative of the direction of the optical traffic flow, not the number of the physical fibers used for transport). It is clear that the Express Path losses are to be kept to minimum and in configurations such as Metro Rings it is critical that these losses will be minimal (so there will be no need to use any amplification devices in this path). Moreover, an NE for these Metro rings has to be as inexpensive as possible. The add/drop UNIs are less restricted with their losses; as usually some processing is done on these channels (including amplification).

The OADM usually includes also test facilities, protection devices, etc.

In the frame of the present application, only the traffic flow through OADM will be considered.

Figure 2:
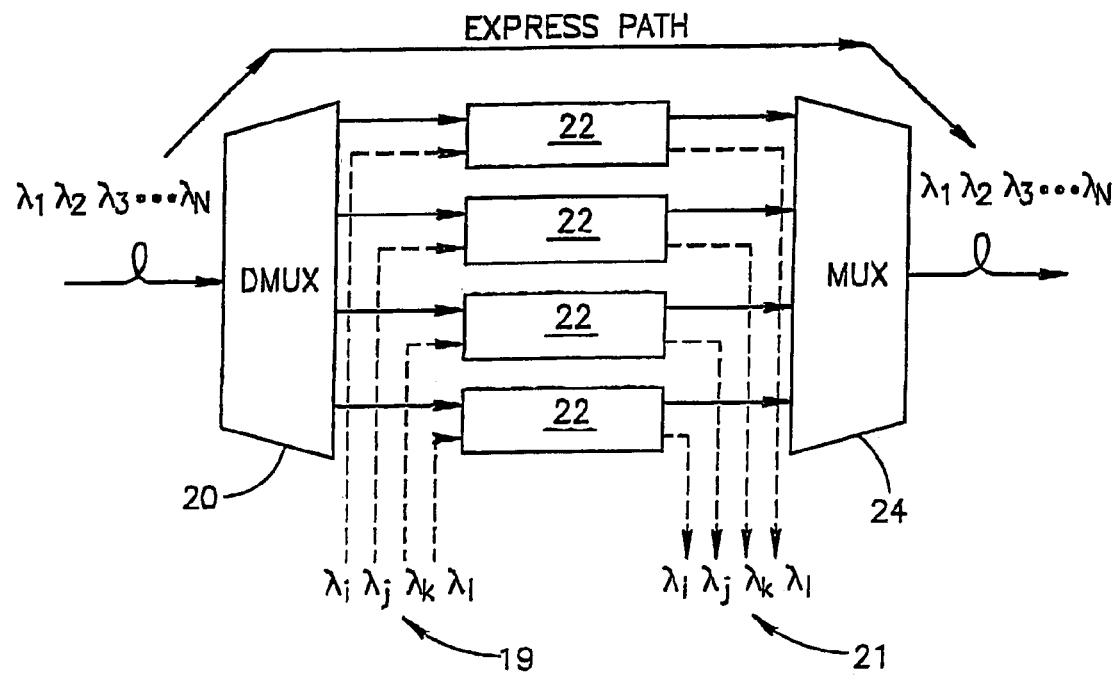
FIG. 2 (prior art)—is a schematic block-diagram of a classical OADM configuration.

FIG. 2 shows the classical implementation of an OADM; the configuration 18 includes:
   DMUX (marked 20) for the separation of all the incoming wavelengths;
   "2×2" optical switches 22 for the add/drop operations;
   ADD channels marked 19,
   DROP channels marked 21,
   MUX 24 for the recombination of all the wavelengths going out on the output fiber.

This classical OADM design has an inherently high throughput loss or insertion loss I.L. (typically more than 90% of the incoming power is lost in the Express Path, which means more than 10 db power loss). The throughput loss is also called insertion loss (I.L.) due to insertion, into the optical fiber, of a complex assembly comprising the complete MUX, DMUX and the whole plurality of optical switches performing the add and drop functions. Moreover, the classical configuration is quite expensive, since typically 40 or 80 channels have to be separated by the DMUX which is a special filtering device with 40 (80) outputs.

Figure 3:
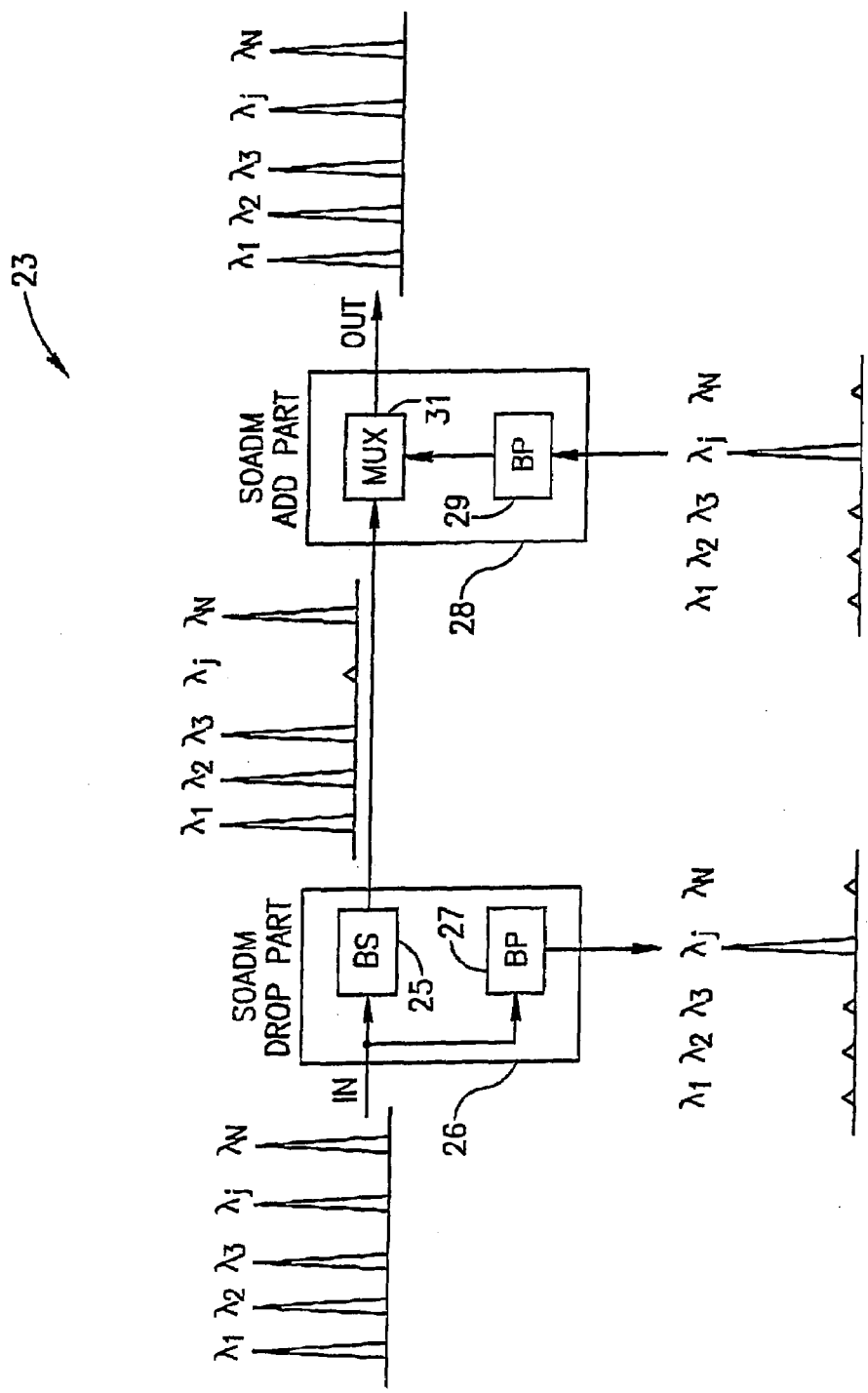
FIG. 3 (prior art)—is a schematic block-diagram illustrating a single-wavelength OADM (SOADM).

FIG. 3 An SOADM for a $\lambda_j$ wavelength can be implemented as a configuration 23, divided into two parts, which is called ADD after DROP configuration.

Functionally the Drop Part 26 Includes:
   a band stop filter 25 to block/stop the passage of the $\lambda_j$ wavelength (which came in the wavelengths stream incoming In port), through the Express Path.
   a band pass filter 27 to separate the $\lambda_j$ wavelength from the incoming wavelengths stream—to enable its "dropping" to the DROP port.

The Add Part 28 Includes Functionally:
   a band pass $\lambda_j$ filter 29 for adding the $\lambda_j$ wavelength.
   a MUX device 31 to combine the added wavelength and the output stream of the DROP block.

The Insertion Loss in the Express Path of a SOADM is typically 1.5÷2.0 db. If more than one wavelength has to be dropped/added, SOADMs can be cascaded. Usually no more than four SOADMs are cascaded because of the considerable total insertion loss (I.L.=6÷8 db) in the Express Path.

Figure 4:
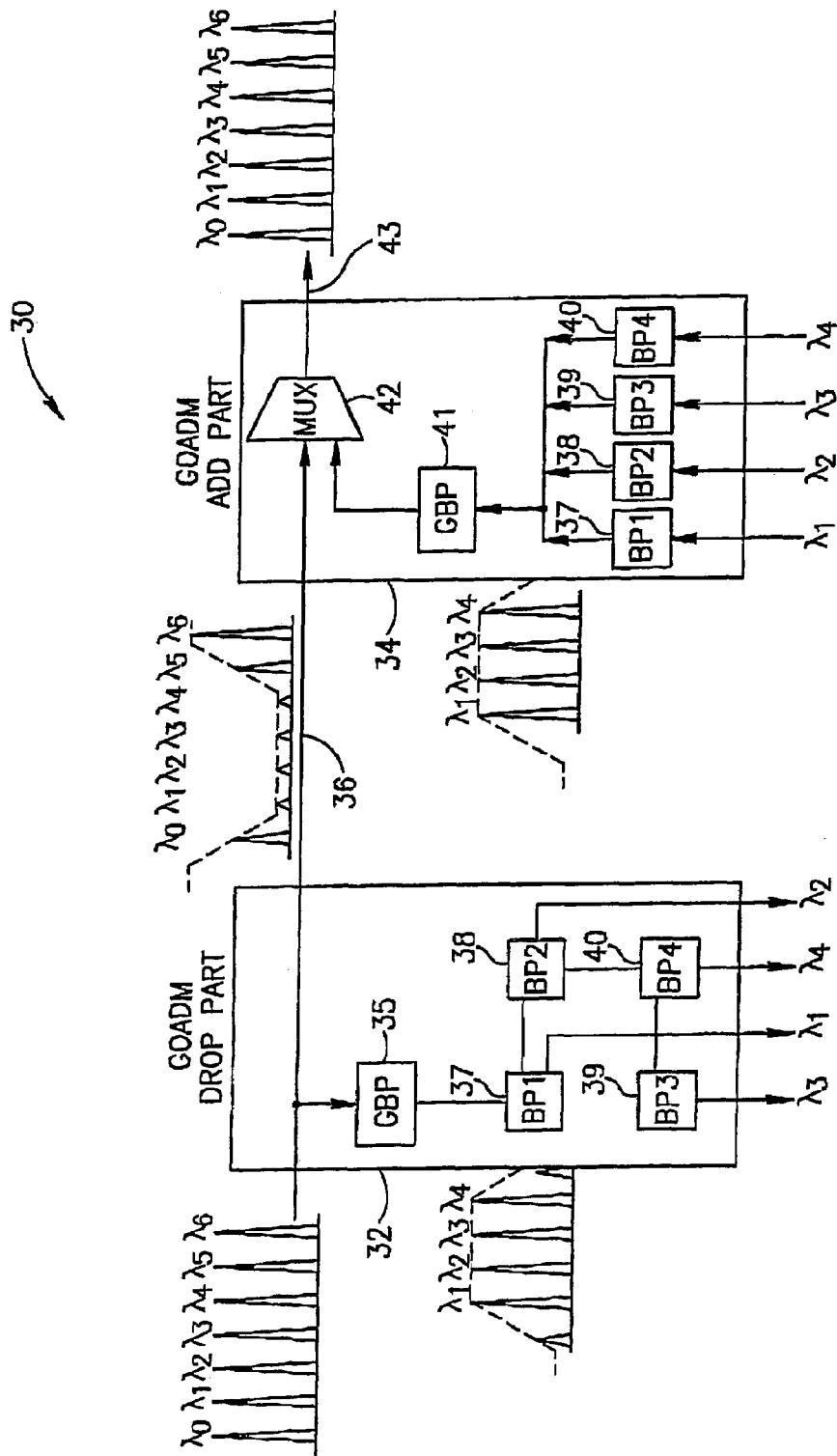
FIG. 4 (prior art)—illustrates a block-diagram of a grouped OADM (GOAM).

FIG. 4 illustrates a schematic block-diagram of a known and widely used embodiment of a Grouped OADM. As has been shown, the I.L. of a single add/drop filter like that in the SOADM is typically 1.5–2.0 db. To keep this advantage for more than a single wavelength, the GOADM includes (functionally) a wide band stop filter and a wide band pass filter. Each of these filters take care of more than one wavelength (typically 4 adjacent wavelengths in the ITU-T wavelengths Grid) Practically the GOADM is implemented by a primary single optical wide band pass filter which, in the DROP operation, diverts the optical energy of the appropriate group of wavelengths from the incoming stream of wavelengths to the drop interface. Only a small part of these wavelengths pass through the Express Path. A secondary group of filters are introduced in the drop port to separate the wavelengths of the dropped group.

The illustrated GOADM configuration 30 is an ADD after DROP GOADM which, similarly to the SOADM in FIG. 3, also comprises two main parts: the GOADM DROP part 32 and the GOADM ADD part 34. The GOADM DROP part is implemented by a primary, single optical wide band pass filter 35 which diverts the optical energy of the group of wavelengths ($\lambda1,\lambda2,\lambda3,\lambda4$) from the incoming stream of wavelengths to the drop interface. The remaining wavelengths pass through the Express Path 36: for example, $\lambda0,\lambda5,\lambda6$ . . . .

A secondary group of filters 37, 38, 39, 40 (in this case, four cascaded filters) are introduced in the drop port of the block 32 to separate the four wavelengths $\lambda1$, $\lambda2$, $\lambda3$, and $\lambda4$ from the dropped group ($\lambda1,\lambda2,\lambda3,\lambda4$).

The GOADM 30 is utilized to add a group of adjacent wavelengths (for example, the same group as those which have been dropped by block 32, but each carrying different digital information) and combine them with the stream of wavelengths from the Express path 36. This operation is performed by the ADD part 34. In this particular embodiment, for picking four channels to be added to the optical network, the ADD part comprises four band pass filters BP1 to BP4 identical to those in the DROP part 32 and therefore marked with the same reference numerals. The optical channels received from the filters 37 to 40 of the block 34 are collected by a grouped band pass filter 41 and brought to a MUX 42 which combines the group with the channels arriving from the express path 36. The output port 43 of the GOADM comprises all the wavelengths which arrived to its input port.

The I.L. from the input port to the output port of the combined drop/add GOADM is typically 1.5–2.0 db. The I.L. from the input port to the outputs of the secondary filters may be higher, according to their technology and configuration (i.e. a cascade).

The main disadvantage of the GOADM lies in its advantageous, primary wide band pass filter—to get a simple single wide band pass filter, the edges of this filter (on both sides of the filter) are "sloped". This will be further explained with the aid of FIG. 5.

FIG. 5 is a schematic illustration of the principle of operation of a conventional wide band filter used for creating groups of wavelengths (channels) from an available spectrum of the wavelengths. The spectrum comprises a plurality of optical channels each having its own wavelength. The channels are schematically shown by the plurality 45 of vertical arrows. Suppose, the spectrum is divided into four sub-spectrums (groups) A, B, C and D, each comprising four optical channels. The groups are obtained by wide-band filters having sloped characteristics which are schematically shown by parabolic curves under the letters A, B, C, D. The channels indicated by the solid arrows belong to the obtained groups and will be further separated for transmitting to/from a customer the information which is carried over the channel. The intermediate channels shown by the thin arrows are attenuated by the sloped filter response(s) and thus cannot be used for transmitting information in the network (neither for adding/dropping, nor for the express transmission). Those wavelengths can also interfere with the equivalent wavelengths in adjacent groups of wavelengths (i.e., produced by adjacent GOADMs while such adjacent groups of wavelengths can be distributed anywhere, in the NEs, in the Optical Ring, etc. The result of the sloped edges of the GOADM's filter, is that practically at least 20% of the wavelengths in an Optical Communication Window cannot be used (8 out of 40 wavelengths, at least, in a 40 wavelengths' window of the ITU-T Grid). In FIG. 4, the channels with wavelengths $\lambda 0$ and $\lambda 5$ are such damaged (attenuated) optical channels.

FIG. 6 illustrates the principle of operation of the periodic filter which, in the present invention, is used as the basis of a novel GOADM.

A spectrum of the available optical channels (wavelengths) arriving to an input of the periodic filter is schematically marked 50 and comprises a plurality of wavelengths indicated by five different periodically repeating patterns. The periodic filter has a property and can be preliminarily set so as to periodically extract, from the spectrum 50, wavelengths of one and the same pattern (i.e., optical channels with a particular spacing which corresponds to the FSR of the filter). Actually, the periodic filter creates Group I of wavelengths which comprises $\lambda j$, $\lambda 2j$, $\lambda 3j$ and $\lambda 4j$ and marked 52. Another periodic filter (or the same periodic filter after adjusting thereof) may extract, from the spectrum 50, Group II of the optical channels: $\lambda i$, $\lambda 2i$, $\lambda 3i$ and $\lambda 4i$, which is marked 54.

As can be seen, channels in the extracted groups are spaced from one another, thus enabling easy filtering of any particular channel from one or another group. This is an additional advantage of the proposed GOADM, allowing utilizing simple inexpensive filters for separating (adding or dropping) particular optical channels.

The periodic filter can be obtained by narrowing the F.S.R. (Free Spectral Range) parameter of the SOADM's filters with a center frequency at $\lambda_j$. As a result, we will get a sequence ("comb") of periodic band pass filters, beginning from the $\lambda_j$ single band pass filter with the narrow pass bands ("teeth" of the comb) shifted one from another by the F.S.R. measure. The shifting of the center frequencies of the comb's filters can be so provided as to fit the wavelengths defined by the ITU-T grid.

The formal expression for the center frequencies of the Comb's teeth is $\lambda_{J+\alpha K}$, $\alpha = \{1,2,3, \ldots \}$, where $\lambda_j$ is the basic center frequency of the single filter. For an Optical Communication Window of 40 wavelengths $(j+\alpha k) \leq 40$.

For example, a comb may include the following center frequencies: $\lambda_j$, $\lambda_{j+10}$, $\lambda_{j+20}$, $\lambda_{j+30}$. With this technique we can use an adjacent comb with $\lambda_{j+1}$, $\lambda_{j+11}$, $\lambda_{j+21}$, $\lambda_{j+31}$. A special case of such a comb band pass filter is the Odd-Even Interleaver which has one input port and two output ports. At one output port we will get the odd wavelengths of those coming into the input port and at the second output we will get the even wavelengths of those coming into the input port.

Figure 7A:
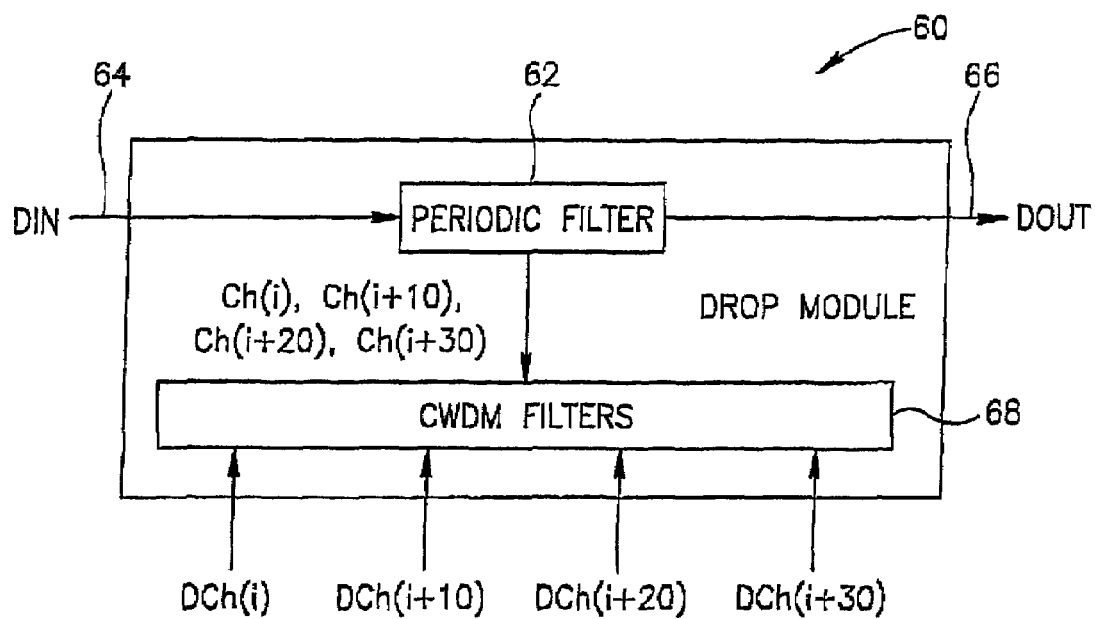
FIG. 7*a* illustrates a so-called filter diagram of a drop module of the proposed periodic GOADM (GPOADM).
Figure 7B:
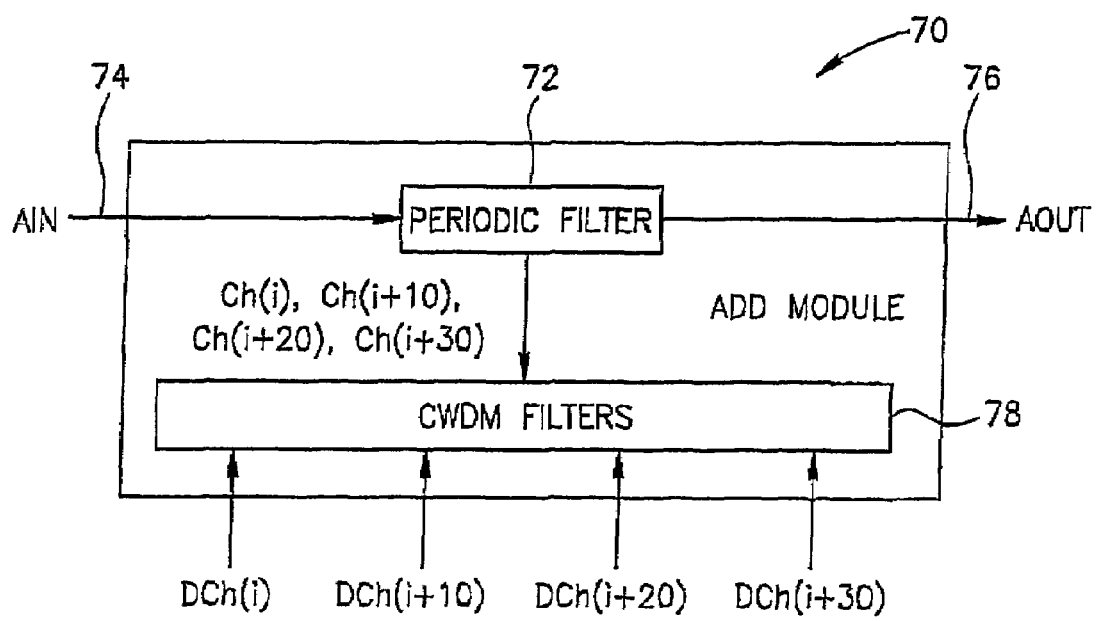
FIG. 7*b* shows a filter diagram of an add module of the proposed GPOADM.

FIGS. 7a and 7b illustrate exemplary embodiments of two main modules which can be used in the proposed GPOADM: a DROP module 60 and an ADD module 70, respectively.

Let periodicity of periodic filters 62 and 72 is equal to 10, and the group created by the periodic filters 62 and 72 comprises optical channels with wavelengths spaced by 10 channels in the ITU Grid and schematically indicated as follows: Ch(i), Ch(i+10), Ch(i+20) and Ch(i+30).

Let the spectrum 64 entering the DROP module 60 (the input of the DROP module is indicated as DIN), comprises an initial plurality of wavelengths stated by the ITU Grid. The periodic filter 62, being a primary or a first stage filter, cuts out from the spectrum 64 only a sub-spectrum comprising the above-indicated spaced channels. All the remaining channels pass to the exit DOUT (66) of the DROP module. The group of channels cut-out by the filter 62 are further filtered by an assembly 68 of second stage filters, such as wide-band CWDM (Coarse WDM) filters, and the filtered optical channels are separately emitted from the filters assembly 68 as dropped channels DCh(i), DCh(i+10), DCh(i+20) and DCh(i+30). It should be mentioned that the newly proposed GOADM which is actually a Grouped Periodic OADM, may comprise only the DROP module if so required by a particular application.

In FIG. 7b, the ADD module 70 of the GPOADM is shown, which is capable of performing the inverse, adding operation. Namely, second stage filters 78 pick the channels required to be added to the network: ACh(i), ACh(i+10), ACh(i+20) and ACh(i+30), and the periodic filter 72 adds these channels into the express line, with the stated periodicity, via the output AOUT.

It should be noted that the group of channels added to the express line may differ from those dropped in the DROP module, for example may comprise less channels, or totally different channels which are currently free of transmitting information in the express line. The symmetric examples of channels shown in FIGS. 7a, 7b are just more illustrative. Though any of the modules shown in FIGS. 7a and 7b may be used separately and each form a single network element, the proposed GPOADM can be implemented in a dual configuration, where the output 66 is preferably connected to the input 74 to form together the express path of the ADD after DROP embodiment. The second stage filters 68 and 78 in the ADD and DROP modules, respectively, are not required to be narrow band expensive filters. It is quite sufficient that such filters be capable of picking optical channels of the spaced or periodic group (since in the spaced group, the adjacent channels are remote from one another by 10 channels of the initial spectrum).

The present invention proposes a technique and its implementation, which enables the use of all the wavelengths defined by ITU-T in the Optical Communication Window—without losing 20% of these wavelengths would conventional GOADMs be used in the Optical Ring Network.

Figure 8:
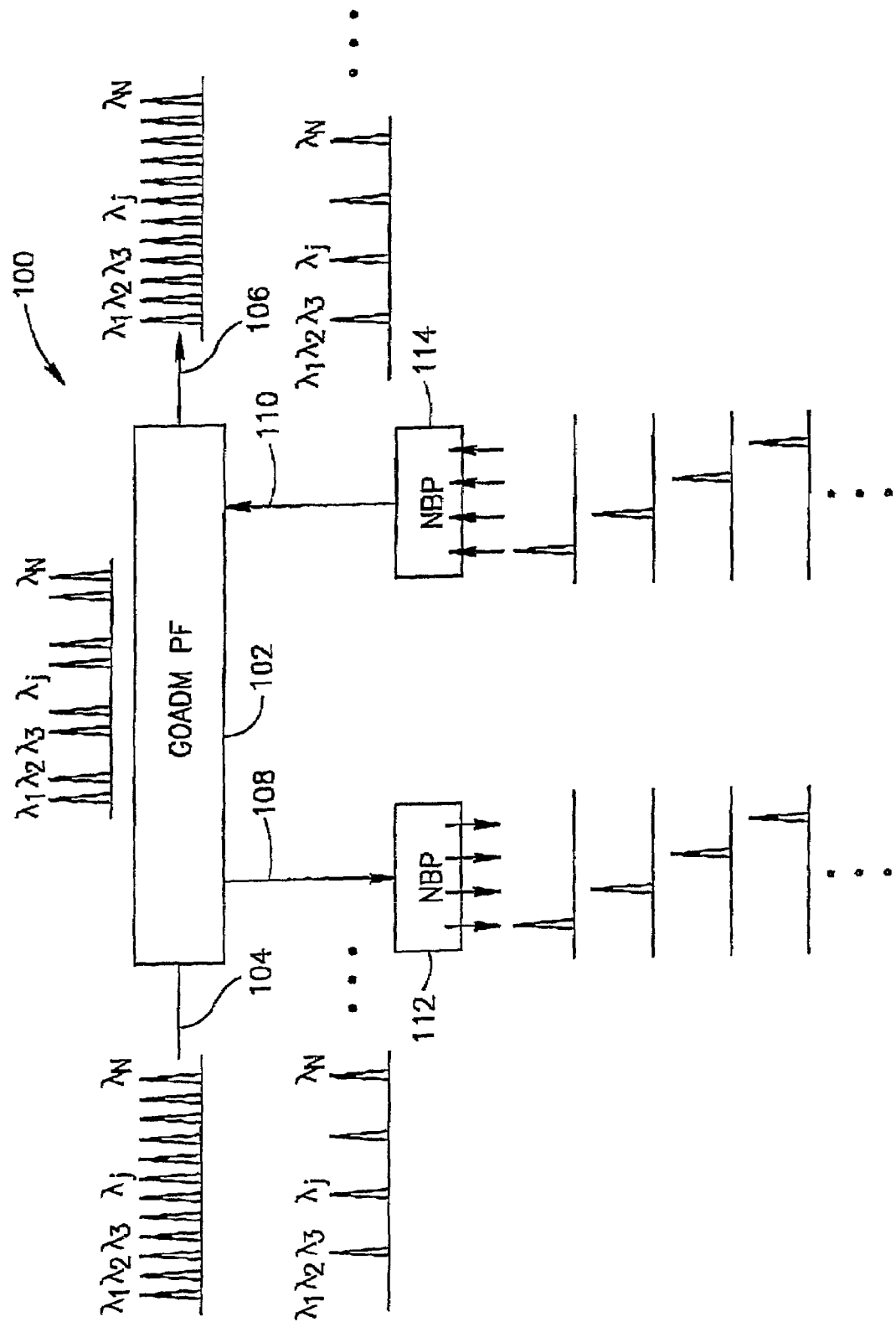
FIG. 8 is a schematic filter diagram of another embodiment of the GPOADM.

FIG. 8 illustrates one particular embodiment of the GPOADM 100 where the ADD and DROP functions can simultaneously be performed by means of one and the same integrated periodic filter (PF) 102. Such a configuration having an input port 104, and output port 106, a DROP port 108 and an ADD port 110 can be implemented using a micro-ring structure. In this embodiment, the DROP port is connected to an assembly 112 comprising N band pass filters; the similar arrangement is provided on the DROP port 110 which is coupled to a filter assembly 114. In this particular example, four optical channels are shown among the dropped ones, and four channels are shown among the added ones.

Figure 9:
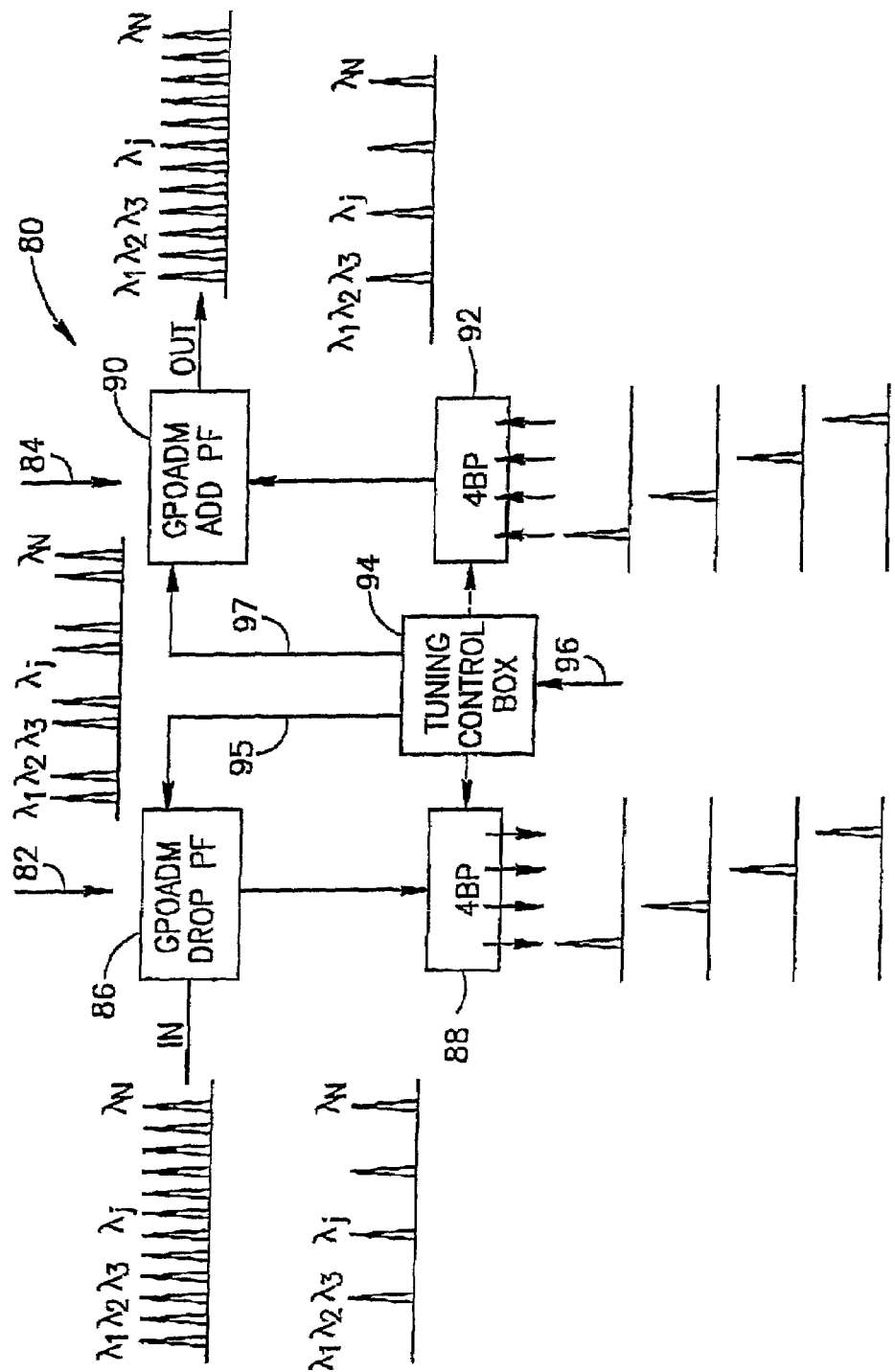
FIG. 9 is a schematic filter and pictorial diagram of the proposed tunable periodic GOADM (or GPTOADM).

FIG. 9 schematically shows an embodiment of a tunable periodic GOADM (GPTOADM) 80 having a dual configuration consisting of a DROP part 82 and an ADD part 84. The DROP part 82 comprises a primary periodic DROP filter 86 separating four wavelengths from the initial spectrum, and an assembly 88 of four secondary band pass filters. The secondary filters in the assembly 88 may be cascaded, like the secondary filters in the GOADM DROP module in FIG. 4; however, they may be connected in parallel, so that each of them receives the output of the periodic filter 86, and filters out therefrom one of the required wavelengths. Such a parallel connection of the secondary filters in block 84 is more universal, since it also suits for the ADD operation. The GPOADM ADD part 84 comprises its primary periodic filter 90 provided with a suitable assembly of four secondary filters 92. In this embodiment, the periodic filter 86 is initially similar to the periodic filter 90, and the secondary filters 88 are initially and respectively similar to the filters 92.

The wavelengths added and/or dropped by the GPOADM 80 can be tuned by means of a Tuning Control Block 94 which is capable of processing one or more external commands 96 and is operative to finely adjust the group of wavelengths which is formed by any of the periodic filters 86 and 90. It should be noted, that the Control block 94 may issue different control signals to the periodic filters 86 and 84, thereby enabling independent regulation thereof (arrows 95, 97). Optionally, the Control block 94 may issue instructions for tuning the secondary filters 88 and 92 according to the tuning provided in the respective primary filters 86 and 84. However, if the tuning in one or both of the primary filters is relatively fine (say, the group, instead of starting from $\lambda_j$, should start from channel $\lambda_{j+1}$), and the suitable secondary filters are sufficiently wide band to pick the shifted optical channels from the modified but still "spaced" group, the respective secondary filters may be left non-tuned. Generally, the primary periodic filters can be adjusted to alter the number and the frequency of optical channels included in the group. For example, to perform the adjustment, the periodic filter may be "shifted" to start picking optical channels from any member of the ITU-T Grid, and to perform the picking a predetermined number of times with a predetermined spacing (FSR).

What is claimed is:

1. A Grouped Optical Add Drop Multiplexer (GOADM) comprising:
   a tunable periodic filter for dropping or adding a group of optical wavelengths from/to a spectrum of optical wavelengths transmitted over an optical line so that adjacent optical wavelengths in the spectrum are initially spaced from one another by a basic wavelength step "s", where in said tunable periodic filter is inserted in said optical line as a primary filter and is constructed to pick selected wavelengths of the group such that adjacent wavelengths of the group are spaced from one another by a group step being equal to ks, wherein k is an integer >1; and
   at least one secondary filter connected to said tunable periodic filter serving as a primary filter, said at least one secondary filter being automatically tunable in response to tuning of said tunable periodic filter.

2. The GOADM according to claim 1, wherein said at least one secondary filter is responsible for dropping or adding one particular wavelength from/to said group.

3. A Grouped Optical Add Drop Multiplexer (GOADM) comprising:
   a tunable periodic filter for dropping and adding a group of optical wavelengths from/to a spectrum of optical wavelengths transmitted over an optical line so that adjacent optical wavelengths in the spectrum are initially spaced from one another by a basic wavelength step "s", where in said tunable periodic filter is inserted in the optical line as a primary filter and is constructed to pick selected wavelengths of the group such that adjacent wavelengths of the group are spaced from one another by a group step being equal to ks, wherein k is an integer >1;
   a first assembly comprising at least one secondary drop filter connected to said tunable periodic filter for dropping a particular wavelength from the group, said at least one secondary drop filter being automatically tunable in response to tuning of said tunable periodic filter; and
   a second assembly comprising at least one secondary add filter connected to said tunable periodic filter for adding a particular wavelength to the group, said at least one secondary add filter being automatically tunable in response to tuning of said tunable periodic filter.

* * * * *